United States Patent
Mhatre et al.

(10) Patent No.: US 7,936,704 B2
(45) Date of Patent: May 3, 2011

(54) METHOD FOR ROUTING AND LOAD BALANCING IN COMMUNICATION NETWORKS

(75) Inventors: Vivek Mhatre, Kalwa (IN); Henrik Lundgren, Paris (FR); Christophe Diot, Paris (FR); François Baccelli, Meudon (FR)

(73) Assignee: Thomson Licensing, Boulogne-Billancourt (FR)

( * ) Notice: Subject to any disclaimer, the term of this patent is extended or adjusted under 35 U.S.C. 154(b) by 17 days.

(21) Appl. No.: 12/313,764

(22) Filed: Nov. 21, 2008

(65) Prior Publication Data

US 2009/0135738 A1    May 28, 2009

(30) Foreign Application Priority Data

Nov. 22, 2007    (EP) .................................... 07301565

(51) Int. Cl.
*H04L 12/28* (2006.01)
(52) U.S. Cl. .................... 370/256; 370/354; 370/350
(58) Field of Classification Search .................. 370/256, 370/354, 350
See application file for complete search history.

(56) References Cited

U.S. PATENT DOCUMENTS

2006/0215583 A1*  9/2006  Castagnoli .................... 370/254

OTHER PUBLICATIONS

Ohata, N. et al, "Fairness Improvement and Efficient Rerouting in Mobile Ad Hoc Networks", IEEE, Jun. 2007, pp. 3333-3338, XP031126185.
Yang Li, et al, "Three Load Metrics for Routing in Ad Hoc Networks", IEEE, Sep. 26, 2004, pp. 2764-2768. XP010787157.
Awerbuch, et al, "The Medium Time Metric: High Throughput Route Selection in Multi-rate Ad Hoc Wireless Networks", Mobile Networks and Applications 11. pp. 253-266. XP002472847.
French Search Report dated Mar. 14, 2008.

* cited by examiner

*Primary Examiner* — Dang T Ton
*Assistant Examiner* — Pamit Kaur
(74) *Attorney, Agent, or Firm* — Robert D. Shedd; Harvey D. Fried; James McKenzie

(57) ABSTRACT

The invention concerns a method of configuring the topology of a communication network comprising a plurality of nodes (i,j, . . . , N), the communication network being organized as a forest structure comprising trees and subtrees, wherein at least one node i maintains a periodic timer and an expiration of the timer of the node i triggers the steps of: searching, by the node i, a parent node; selecting, by the node i, a parent node using at least throughput and subtree size as selection criteria; and migrating the node i to the selected size as selection criteria; and migrating the node i to the selected parent node along with its subtree size. Preferably, the step of selecting a parent node by the node i comprises a sub-step of executing a function having as parameters respective subtree sizes of a node j before and after the migration of the node i to another node k.

7 Claims, 4 Drawing Sheets

(a) Topology before migration of node i
(b) Topology after migration of node i
(c) Nodes whose ETP is affected
(d) Nodes whose subtree size is affected Nodes affected by migration of node $i$ from node $j$ to node $k$ are depicted as black circles.

Figure 1: Mesh Backbone.

Figure 2: Nodes affected by migration of node $i$ from node $j$ to node $k$ are depicted as black circles.

METHOD FOR ROUTING AND LOAD BALANCING IN COMMUNICATION NETWORKS

FIELD OF THE INVENTION

The present invention pertains to the field of communication networks.

The present invention more particularly relates to a method of configuring the topology of a communication network.

BACKGROUND OF THE INVENTION

Mesh networking can be defined as a way to route data, voice and instructions between nodes. It allows for continuous connections and reconfiguration around broken or blocked paths by "hopping" from node to node until the destination is reached. A mesh network whose nodes are all connected to each other is a fully connected network. Mesh networks differ from other networks in that the component parts can all connect to each other via multiple hops, and they generally are not mobile. Mesh networks can be seen as one type of ad hoc network.

A node is a critical element of any computer network. It can be defined as a point in a network at which lines intersect or branch, a device attached to a network, or a terminal or other point in a computer network where messages can be created, received, or transmitted. A node can be any device connected to a computer network. Nodes can be computers, personal digital assistants (PDAs), cell phones, or various other networked devices. On a TCP/IP network, a node is any device with an IP address. If the node is a computer, it is more often called a "host". A node is a connection point, either a redistribution point or an end point, for data transmission. In general, a node has programmed or engineered capability to recognize and process or forward transmissions to other nodes. If the network in question is the Internet, every node must have a MAC address or Data Link Control address if it is at least a data link layer device, as defined in the OSI model.

Routing algorithms for mesh network have to be robust to node failures, and link quality variations due to packet loss, and shadow-fading. It has been shown in the scientific publication "Performance Anomaly of 802.11 b" (M. Heusse, F. Rousseau, G. Berger-Sabbatel, A. Duda, in proc. of IEEE Infocom 2003, San Francisco, Calif., USA, March 2003) that the MAC-layer interactions play a significant role in determining the capacity of a link. The MAC-layer is the Media Access Control layer that arbitrates access of nodes to the wireless medium. In particular, depending on the MAC-layer contention, the goodput of a link can be substantially lower than its bit rate due to sharing of the wireless medium by multiple nodes. Past work has primarily focused on defining routing metrics to determine high throughput routes. Examples of such routing metrics are MAC-agnostic routing metrics, such as ETX [D. S. J. De Couto, D. Aguayo, J. Bicket, and R. Morris, "A High-Throughput Path Metric for Multi-Hop Wireless Routing" in proc. of ACM MobiCom 2003, San Diego, Calif., USA, Sep 2003], ETT [J. Padhye, R. Draves, and B. Zill, "Routing in Multi-radio, Multi-hop Wireless Mesh Networks" in proc. of ACM MobiCom 2004, Philadelphia, Pennsylvania, USA, Sep 2004], and MAC-aware routing metrics, such as ETP [V. Mhatre, H. Lundgren, and C. Diot. Mac-aware routing in wireless mesh networks. In The Fourth International Wireless on Demand Network Systems and Services (IEEE/IFIP WONS 2007), Obergurgl, Austria, January 2007], EDR [J. C. Park and S. Kasera, "Expected Data Rate: An Accurate High-Throughput Path Metric For Multi-Hop Wireless Routing" in proc. of IEEE Communications Society Conference on Sensor and Ad Hoc Communications and Networks, SECON 2005, Santa Clara, Calif., USA, Sep 2005], IRU [Y. Yang, J. Wang, and R. Kravets, "Designing Routing Metrics for Mesh Networks" in proc. of IEEE Workshop on Wireless Mesh Networks WiMesh 2005, Santa Clara, Calif., USA, Sep 2005].

When shortest path routing is used with any of the above routing metrics, the resulting routing algorithms do not support load balancing. This is because the load-agnostic behavior of shortest path algorithms can result in scenarios where a few gateways have too many associated mesh nodes, while other gateways are under-utilized. Further load imbalance in the network could be caused by gateway failures. 100% uptime for gateways is not possible, since the connection of the gateways to the Internet may fail occasionally, or the gateways may be unreachable [http://www.netequality.net]. Consequently, failure of one or more gateways can lead to overloading of a few selected gateways. Load balancing and routing algorithms which recently proposed in [Y. Bejerano, S. Han, and A. Kumar, "Efficient load-balancing routing for wireless mesh networks" Computer Networks, Elsevier Science, 2007, Vol. 51, pp 2450-2466] to handle such load imbalance do not take the MAC-layer interaction into account.

SUMMARY OF THE INVENTION

Since the number of gateways in a mesh network is limited, the routing should ensure that the traffic load is optimally distributed across all the gateways. Furthermore, in a wireless network, the links have complex interdependence due to their MAC-layer interaction through the CSMA-CA (Carrier Sense Multiple Access with Collision Avoidance) protocol. The routing decisions should ensure that links that experience heavy contention should not be used for carrying the majority of the routing traffic. Thus, the routing problem must address the above two constraints.

Past approaches to routing in mesh networks either (i) do not account for the MAC-layer interactions between the links in a tractable manner, or (ii) are agnostic to load-balancing across gateways.

The present invention is defined, in its broader sense, as a method of configuring the topology of a communication network comprising a plurality of nodes (i, j, . . . , N), said communication network being organized as a forest structure comprising trees and subtrees, characterized in that at least one node i maintains a periodic timer and in that an expiration of said timer of said node i triggers the steps of:

searching, by said node i, a parent node;

selecting, by said node i, a parent node using at least throughput and subtree size as selection criteria; and migrating said node i to the selected parent node along with its subtree size.

Preferably, the step of selecting a parent node by said node i comprises a sub-step of executing a function having as parameters respective subtree sizes of a node j before and after the migration of said node i to another node k.

According to a preferred embodiment, the step of selecting a parent node by said node i is performed by using a routing metric referred to as the Expected Throughput ETP defined as:

$$\frac{1}{ETP_{l_i}} = \frac{1}{P_{l_i}} \cdot \sum_{j \in M} \frac{1_{\{l_i \Delta l_j\}}}{R_{l_j}} \quad (1)$$

M being the set of nodes, the indicator function $1\{l_i \Delta l_j\}$ being one if links $l_i$ and $l_j$ contend with each other and zero otherwise, $P_{l_i}$ being the probability that a packet transmission on link $l_i$ is successful and $R_{l_j}$ being the nominal bit rate of link $l_j$.

Advantageously, said method comprises a step of, for each node $k \in S_i$, where $S_i$ is the set of candidate parent nodes of node i, forming set $H_{ik}$, which is the set of nodes that are affected if node i migrates to node k.

According to a particular embodiment, the method comprises the step of computing the following quantity:

$$\Delta_{ik} = \sum_{j \in H_{ik}} \left\{ \frac{|T'_j|^2}{ETP'_{l_j}} - \frac{|T_j|^2}{ETP_{l_j}} \right\},$$

where $|T_j|$ and $|T'_j|$ are the respective subtree sizes, while $ETP_{l_j}$ and $ETP'_{l_j}$ are the respective ETPs of node j before and after the migration of node i to node k.

Preferably, the potential parent is $F'_i$, which results in a reduction of the function:

$$F'_i = \text{argmin}_{k \in S_i} \Delta_{ik}.$$

Advantageously, the migration to $F'_i$ is performed if $F'_i \neq F_i$, where $F_i$ is the initial parent.

According to a particular embodiment, the computing steps that are necessary for node i to select the parent node are distributed among different nodes.

The method according to the invention is different from the solutions of the prior art, at least for the following reasons:
- Mesh routing as well as load balancing is performed in a joint fashion in the method according to the invention; and
- The method according to the invention has a unique cross-layer approach in that it takes MAC and routing into account at the same time, which is unlike the prior art.

The present invention can be defined as a tractable, distributed, and greedy mesh routing method that jointly addresses the MAC interactions between the links as well as load balancing across the gateways. The solution according to the present invention works around the tractability problem arising from the interaction between MAC and routing, and jointly solves the problem of MAC-aware routing and load balancing. Instead of using shortest path routing, the solution according to the present invention determines a delay optimal routing forest (union of disjoint trees rooted at the gateways).

The invention allows to optimize resources for mesh routing and load balancing.

The method according to the invention is beneficial to the mesh network scenarios which have topology imbalance. Such imbalance often arises when one or more gateway nodes fail. Simulation results show that in scenarios of gateway failures, the solution according to the invention results in 30-60% throughput improvement over other load balancing techniques, as well as over other proposed routing solutions (see FIG. 4).

For scenarios in which there is no load imbalance, the solution according to the invention performs as well as, or marginally better than other proposed solutions.

BRIEF DESCRIPTION OF THE DRAWINGS

The following detailed description will be better understood with the drawings, in which.

DETAILED DESCRIPTION

In the invention, a mesh network comprises a plurality of nodes.

Figure 3:
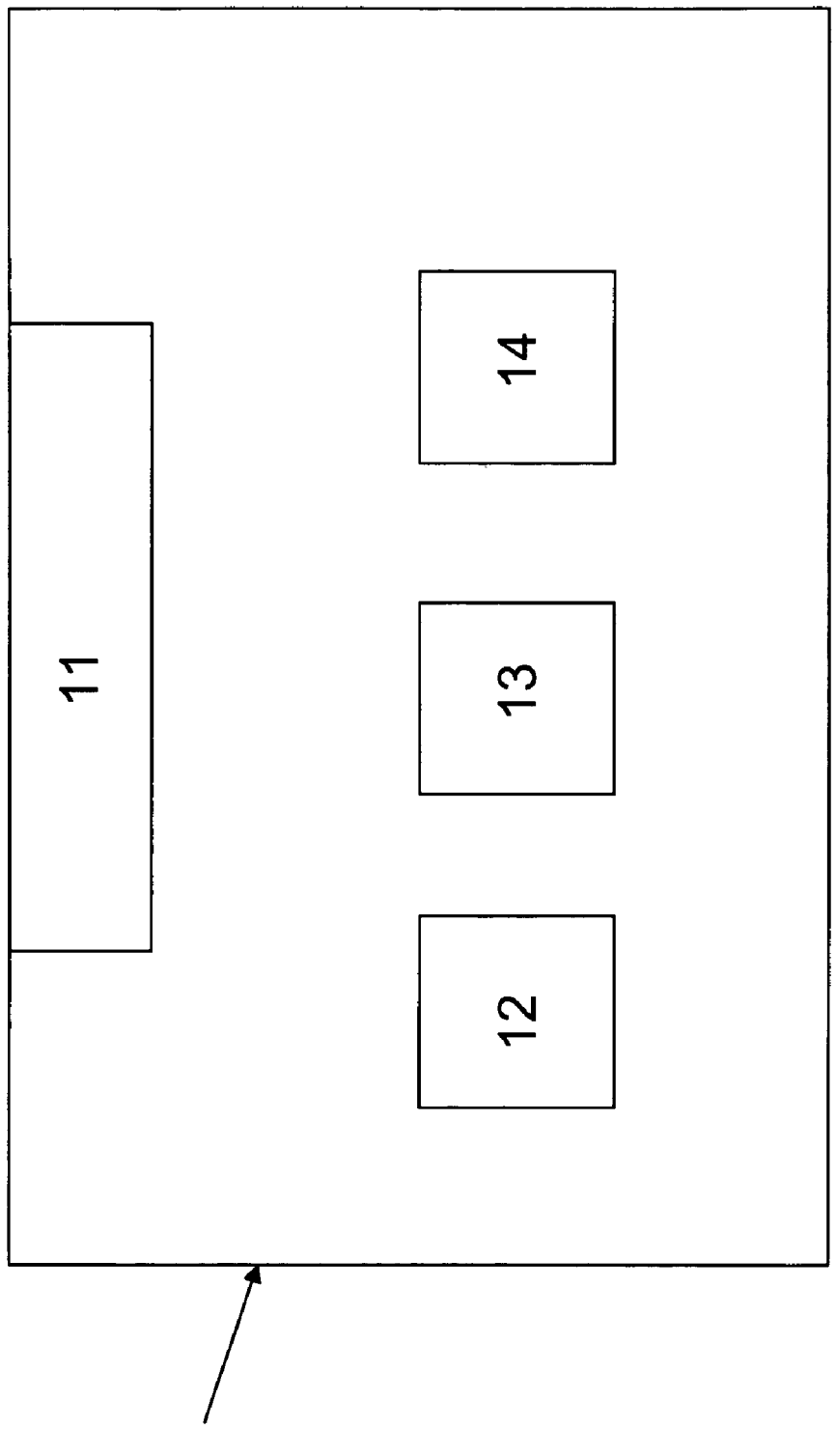
FIG. 3 represents an example of a node.
Figure 4:
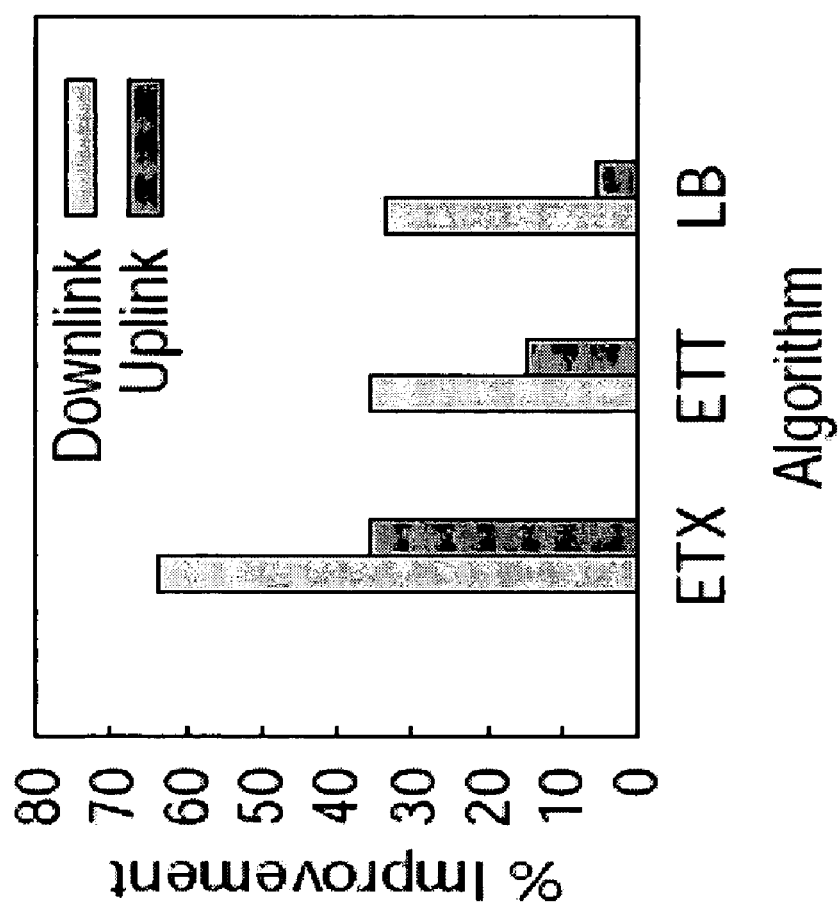
FIG. 4 illustrates the throughput improvement provided by the invention.

The node 1 shown on FIG. 3 comprises a communication interface 11, a processor 12, a volatile memory 13 and a non-volatile memory 14.

Consider a mesh network in which G is the set of gateways that have direct connectivity to the Internet, and M is the set of mesh nodes. Each mesh node $I \in M$ connects to a single gateway, $G(i) \in G$, using other mesh nodes. In this case, mesh node i is considered to be associated with gateway G(i). Nodes are organized in disjoint trees $Tg_i$, each tree rooted at a gateway node $g_i$, $\in G$. Let T be the union of all these trees. Thus, T corresponds to one possible choice of routing. The subtree rooted at mesh node $i \in M$ is denoted by Ti. Note that Ti includes node i. All the nodes have a single radio for mesh communication, and operate over a common channel. The latter assumption is used because if a single radio is available for mesh communication, monitoring of link qualities over multiple channels is difficult. We assume that another radio is available at each mesh node for communication with its clients over an orthogonal channel.

Figure 1:
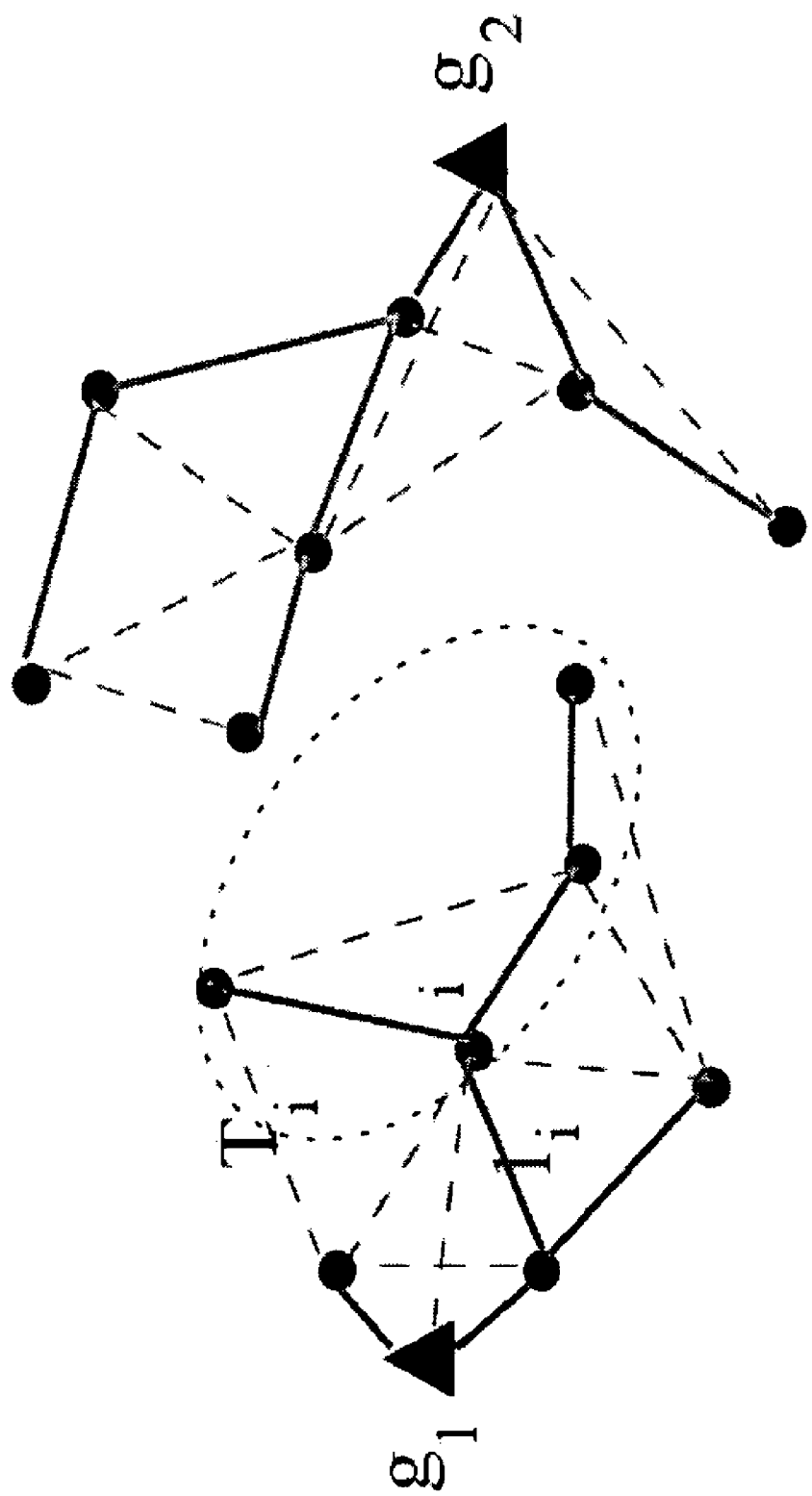
FIG. 1 shows a mesh backbone according to an embodiment of the invention.

Consider the example topology shown in FIG. 1, where the triangles represent gateway nodes g1 and g2, and the circles represent mesh nodes. The tree rooted at each gateway node is shown with solid lines. The dashed lines show those communication links between the node that are not used in the routing tree. Let $l_i$ be the link used by mesh node i to associate (along with its subtree $T_i$) to its parent node in the routing forest. All the nodes in the subtree of node i are contained in the dotted ellipse. We use $l_i$ as the state variable of node i. Note that under the assumption of single-path routing, all the routes in the network are completely determined if for all mesh nodes i, their state variable $l_i$, i.e., their link of attachment to their respective parent is known. Let $P_{l_i}$ be the probability that a packet transmission on link $l_i$ is successful. This probability includes the packet success probability in both directions to account for data as well as ACK frames. Let $R_{l_j}$ be the nominal bit rate of link $l_j$.

Two links contend with each other at the MAC layer if the carrier sensing at the senders or the RTS-CTS (Request to Send and Clear to Send handshake) mechanism preclude them from being active simultaneously. We use the following notation. The indicator function $1\{l_i \Delta l_j\}$ is one if links $l_i$ and $l_j$ contend with each other, and zero otherwise. In other words only one of the two contending links can be active at a time. In 802.11 DCF, the presence of low bit rate links considerably reduces the throughput of a nearby high bit rate link, since the slower links occupy the channel for longer duration. For example, consider k wireless links having nominal bit rates of $R_j$, j=1 to k, and assume that all the links lie within the same contention domain, i.e., only one link from this set can be active at a time. For this scenario, 802.11 DCF allocates on average an equal number of channel access opportunities to all the links. Based on this observation, the following routing metric is referred to as the Expected Throughput (ETP), $$\frac{1}{ETP_{l_i}} = \frac{1}{P_{l_i}} \cdot \sum_{j \in M} \frac{1_{\{l_i \Delta l_j\}}}{R_{l_j}} \quad (1)$$

In the model in Eq. (1), the sum of the inverse of the data rates models the equal time share received by all the contending links, while the success probability term, $P_{l_i}$ is used to obtain the useful throughput of the link. The above model assumes that all contending links can hear each other, i.e., they form a maximal clique. When the links do not form a maximal clique, more elaborate models are needed to predict the link throughput. In these models, it is necessary to numerically solve complex fixed-point equations in a centralized manner. Furthermore, these models require knowledge of all the active links in the network. Since the set of active links in the network directly defines the routing policy in the context of mesh networks, this results in a chicken-and-egg problem. In order to keep our model tractable, we adopt the ETP model and approximate the bandwidth received by $l_i$ using Eq. (1). However, note in Eq. (1), we include all the active links, and not just the links in a given path. Consequently, we take intra, as well as inter-flow contention into account. Although an approximation, the above model captures at least the first order effects of the reduction of link capacities due to MAC-layer contention. Depending on routing, each mesh node j has a unique link $l_j$ for attaching itself to its parent. By summing over $\{j \in M\}$, we include only these active links in the bandwidth computation. Thus we explicitly take into account the impact of routing on link quality.

Shortest path routing algorithms which rely on routing metrics, such as ETX (Expected Transmission Count) and ETT (Expected Transmission Time) do not include support for load balancing across multiple gateways. We build here on top of ETP (Expected Throughput) to incorporate load balancing. In routing forest T, let $P_j$ be the route of node j to its associated gateway, i.e., $P_j$ is the set of links between node j and its associated gateway. A mesh node i is connected to its parent node through link $l_i$. If link $l_i$ belongs to path $P_j$, i.e., j $\in$ Ti, then a fraction of the bandwidth of link $l_i$ is used for the traffic of node j. For simplicity, we assume that all the nodes in a subtree are treated equally, i.e., we assume fair bandwidth sharing within a subtree. Since the expected throughput of link $l_j$ is $ETP_{l_j}$, the throughput received by traffic of node j over link $l_i$ is $$\frac{ETP_{l_i}}{|T_i|},$$

where $|T_i|$ is the number of nodes in subtree Ti (including node i). Hence the transmission delay of a bit of node j over link $L_i$ is $$\frac{|T_i|}{ETP_{l_i}}.$$

Thus, the total transmission delay for node j in sending a bit to its associated gateway is:

$$D_j(\mathcal{T}) = \sum_{k:l_k \in \mathcal{P}_j} \frac{|T_k|}{ETP_{l_k}}$$

The total transmission delay over all of the mesh nodes for sending a bit to their respective gateway nodes is:

$$\mathcal{D}(\mathcal{T}) = \sum_{j \in M} \left\{ \sum_{k:l_k \in \mathcal{P}_j} \frac{|T_k|}{ETP_{l_k}} \right\}. \quad (2)$$

Note that the above cost function includes the effect of spatial multiplexing through the ETP metric. This is unlike shortest path routing with ETT where the computed path metric does not account for the possible concurrent operation of links separated by more than three hops. As a result, ETT unfairly penalizes long paths.

Note that in Eq. (2), all terms are of the form $$\frac{|T_i|}{ETP_{l_i}}$$

For some i. Furthermore, a term such as $$\frac{|T_i|}{ETP_{l_i}}$$

corresponds to link $l_i$, and appears exactly $|T_i|$ times, once for each node in the subtree Ti. Thus, we can rewrite (2) as follows:

$$\mathcal{D}(\mathcal{T}) = \sum_i \frac{|T_i|^2}{ETP_{l_i}}, \quad (3)$$

where $ETP_{l_i}$ is given by (1). Our objective is to determine a routing forest T that minimizes the above cost function.

We solve the problem of determining routes that are optimal with respect to the cost function defined in Eq. (3). Minimizing the objective function in Eq. (3) requires us to evaluate the objective function over all the possible routing forests (exponential complexity). Traditional shortest path algorithms used in conjunction with ETX and ETT are not applicable here, since the link weights in our problem formulation are not fixed, but depend on the routing configuration itself. We are not aware of any algorithms that compute optimum trees when link weights depend on the choice of tree. Hence we propose an algorithm, referred to as MaLB (MAC-aware and Load Balanced routing) that is guaranteed to converge at least to a local minimum of Eq. (3). MaLB is a greedy, and distributed routing algorithm.

In the following, we first briefly describe the idea behind the proposed algorithm, and then present the exact algorithmic details.

It is assumed that as an initial configuration, the network is organized in a forest structure (not necessarily optimum). This could be generated through hop count, ETX, or ETT based routing. Starting with this initial topology, the proposed algorithm progressively reconfigures the network topology.

Figure 2:
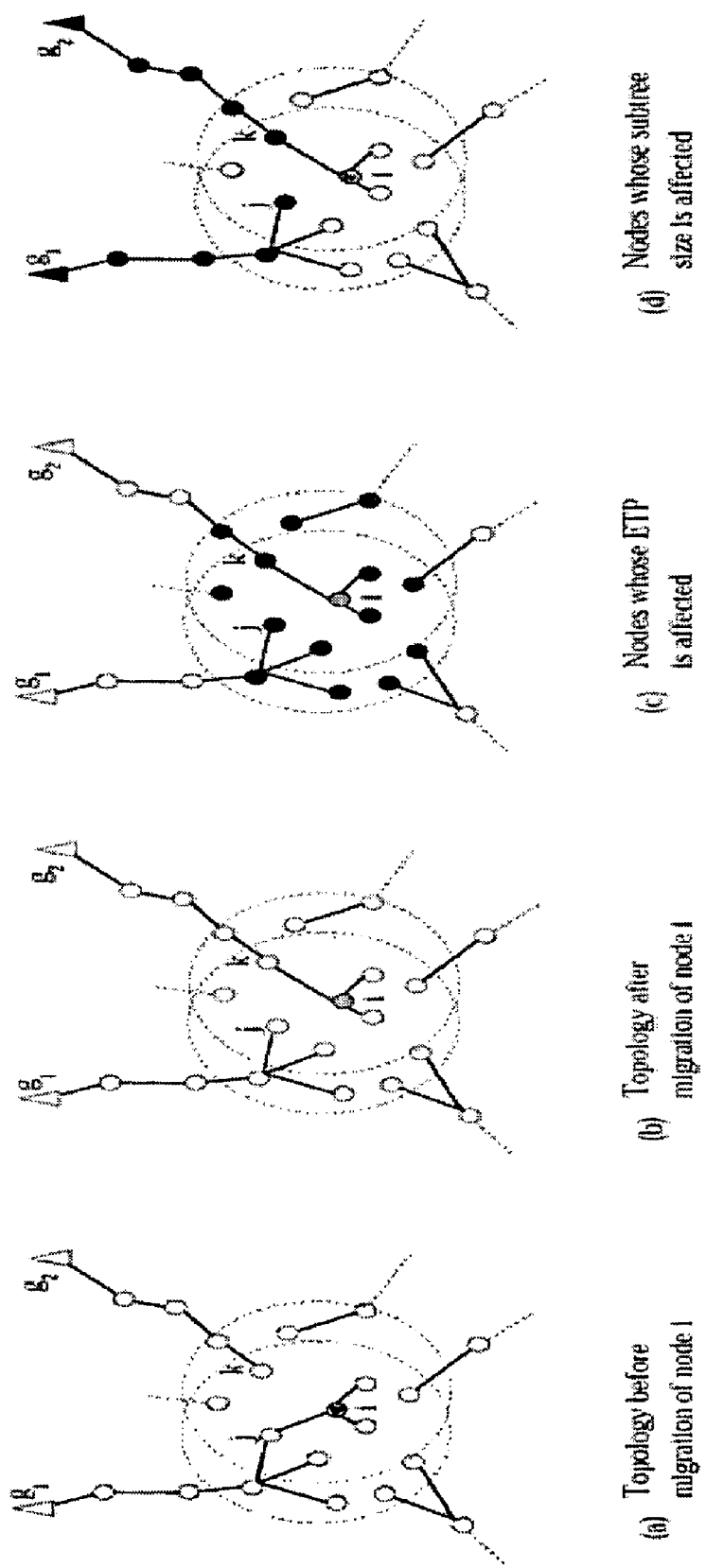
FIG. 2 illustrates as step of the method according to the invention in a particular embodiment.

Each node maintains a periodic timer. When the timer at node i expires, it finds the best point of attachment to the routing forest, or equivalently, the best parent node, and then migrates to the new parent node along with its entire subtree. For example, in FIG. 2, node i migrates along with its subtree from parent j to parent k. A potential migration has an impact on two types of terms in the cost function Eq. (3); the tree size |Tm| of an arbitrary node m, and $ETP_{l_n}$ of an arbitrary node n. This is depicted in FIG. 2 (c) and FIG. 2 (d).

Since the link between node i and j, denoted by $L_i^j$ is no longer used after migration, this also has an impact on the ETP of the active links in the contention domain of nodes i and j. Likewise, after the migration, the link between i and k, denoted by $l_i^k$ which was initially inactive, becomes active.

This has an impact on the ETP of other active links in the contention domain of nodes i and k. FIG. 2 shows the nodes of the links whose ETPs are affected by this migration.

We denote $F_i$ as the current parent of node i. Set $A_k$ denotes the set of ancestors of node k including itself. The set of candidate parent nodes of node i is denoted by Si.

This set includes those neighbors of node i that are not in its subtree (to avoid routing loops). The set of nodes that belong to the contention domain of link $l_j$ is denoted by $CD_{l_j}$. A node belongs to the contention domain of a link if it is in the carrier sensing range of either endpoints of the link. The choice of new parent node is made as follows.

Each node maintains a periodic timer. When the timer of node i expires, it executes the following steps:

1. For each k∈$S_i$, form set $H_{ik}$, which is the set of nodes that are affected if node i migrates to node k.

$$H_{ik} = CD_{l_i^k} \cup CD_{F_i} \cup A_{F_i} \cup A_k.$$

2. For each k∈$S_i$, compute the following quantity which determines the change in the global objective function resulting from the migration of node i to node k $$\Delta_{ik} = \sum_{j \in \mathcal{H}_{ik}} \left\{ \frac{|T_j'|^2}{ETP_{l_j}'} - \frac{|T_j|^2}{ETP_{l_j}} \right\},$$

where $|T_j'|$ and $|T_j|$ are the respective subtree sizes, while $ETP_{l_j}$ and $ETP_{l_j}'$ are the respective ETPs of node j before and after the migration of node i to node k. The quantity $\Delta_{ik}$ can be computed locally at node i.

3. Find the potential parent $F_i'$, that results in the highest reduction of the global objective function:

$$F_i' = \mathrm{argmin}_{k \in S_i} \Delta_{ik}.$$

4. Migrate to $F_i'$, if $F_i' \ne F_i$

Typically, estimation of link quality (bit rate and packet success ratio) requires sending periodic probes, and averaging the observed results over time durations of a few minutes.

This is required, because the random time-varying shadow-fading results in substantial fluctuations in link qualities, and hence responding to such short term fluctuations can lead to route flaps. We assume that the period of the timers running on mesh nodes for making migration decisions are also of the order of few minutes, since reliable link quality estimates are not available at a smaller time scale.

It is also assumed that the message exchange between a node, its children, and its ancestors during a migration can be completed within a few milliseconds, since this involves exchanging short association/disassociation messages. Under this model, it is reasonable to assume that with high probability, at any given instant, only one node is involved in migration in the entire network. For example, in a network of 100 nodes, with a migration timer period of 2 minutes, and assuming that the multi-hop association/dissociation message of 40 bytes travels 10 hops at 6 Mbps, the probability that at least two nodes are simultaneously in the migrating phase is less than $10^{-3}$. Thus, the routing tree information at each node is consistent at every time instant with high probability. With the timer values tuned in accordance with the above observation, we have the following result on the convergence of the algorithm according to the present invention.

The two distinguishing features of the approach presented above are (i) Inclusion of MAC-layer interactions through ETP, and (ii) Load balancing through efficient multi-hop association of mesh nodes to gateways. The MAC interactions between the links lead to substantial increase in the complexity of ETP. Hence, we define a new routing algorithm that performs load balancing, but uses a simple model for estimating the capacity of a link. In this model, the MAC interactions between the links are ignored, and the product of the bit rate and the packet success probability of the link is used as a measure of its capacity. Using the approach presented above, the routing problem is equivalent to finding optimum forest structures which minimize the following objective function corresponding to Eq. (3).

$$\tilde{\mathcal{D}}(\mathcal{T}) = \sum_i \frac{|T_i|^2}{P_{l_i} R_{l_i}}, \qquad (6)$$

Corresponding to the first algorithm presented above, we define another algorithm for finding the optimum routes. This second algorithm forms the middle ground, since it is an intermediate low complexity solution between load-agnostic routing algorithms, such as shortest path with ETX, ETT, and a MAC-aware load balancing routing algorithm such as the first algorithm.

This second algorithm is identical to the first algorithm, except that in the first step, the set of affected nodes $H_{ik}$ does not account for MAC-layer impact, i.e., $H_{ik}$ is defined as follows:

$$H_{ik} = A_{F_i} \cup A_k.$$

Observe that the reciprocal of the term in the denominator of Eq. (6) is the ETT of the parent link of node i. Therefore, comparing Eq. (3) and Eq. (6), we note that the second algorithm corresponds to the case of joint routing and load balancing when the reciprocal of ETT is used as the estimate of the link bandwidth.

It is further shown that the throughput increases progressively as we go from ETX to the first algorithm. The second algorithm has higher throughput than ETX and ETT due to its load balancing attribute. However, further throughput increase can be obtained using the first algorithm when the MAC-layer interaction is also taken into account.

Distributed implementation of the method according to the present invention is possible.

FIG. 2 represents the migrations performed by a node when it executes the method according to the present invention. Such a migration results in reorganization of the routing tree structure. When all the nodes perform such migrations, the routing tree structure converges to the optimum routing configuration.

It is shown that this process converges within a finite number of migrations.

In fact, for a mesh network consisting of 100 nodes, the simulation results show that the method according to the present invention converges after less than 60 migrations.

The above specification, examples and drawings provide a complete description of the method according to the present invention. Since many embodiments of the invention can be made without departing from the spirit and scope of the invention, the invention resides in the claims herein after appended.

The invention claimed is:

1. A method of configuring the topology of a communication network of mesh network type comprising a plurality of nodes (i,j, ..., N), said communication network being organized as a forest structure comprising trees and subtrees, at least one node i maintaining a periodic timer and an expiration of said timer of said node i triggering the steps of:
   searching, by said node i, a parent node;
   selecting, by said node i, the parent node using at least throughput and subtree size as selection criteria;
wherein an expiration of said timer of said node i also triggers the step of:
   migrating said node i to the selected parent node along with its subtree size and, the step of selecting the parent node by said node i is performed by using a routing metric referred to as the Expected Throughput ETP defined as:

$$\frac{1}{ETP_{l_i}} = \frac{1}{P_{l_i}} \cdot \sum_{j \in M} \frac{1_{\{l_i \Delta l_j\}}}{R_{l_j}} \quad (1)$$

M being the set of nodes, the indicator function $1_{\{l_i \Delta l_j\}}$ being one if links $l_i$ and $l_j$ contend with each other and zero otherwise $P_{l_i}$ being the probability that a packet transmission on link $l_i$ is successful and $R_{l_j}$ being the nominal bit rate of link $l_j$.

2. The method of configuring the topology of a communication network of mesh network type according to claim 1 wherein the step of selecting the parent node by said node i comprises a sub-step of executing a function having as parameters respective subtree sizes of a node j before and after the migration of said node i to another node k.

3. The method of configuring the topology of a communication network of mesh network type according to claim 1, comprising a step of, for each node k ∈$S_i$, where $S_i$ is the set of candidate parent nodes of the node i, forming set $H_{ik}$, which is the set of nodes that are affected if the node i migrates to node k.

4. The method of configuring the topology of a communication network of mesh network type according to claim 1, comprising the step of computing the following quantity:

$$\Delta_{ik} = \sum_{j \in \mathcal{H}_{ik}} \left\{ \frac{|T'_j|^2}{ETP'_{l_j}} - \frac{|T_j|^2}{ETP_{l_j}} \right\},$$

where $|T_j|$ and $|T'_j|$ are the respective subtree sizes, while $ETP_{l_j}$ and $ETP'_{l_j}$ are the respective ETPs of node j before and after the migration of node i to node k.

5. The method of configuring the topology of a communication network of mesh network type according to claim 4 wherein a potential parent is $F'_i$, which results in a reduction of the function:

$$F'_i = \mathrm{argmin}_{k \in S_i} \Delta_{ik}.$$

6. The method of configuring the topology of a communication network of mesh network type according to claim 5 wherein the migration to $F'_i$ is performed if $F'_i \neq F_i$, where $F_i$ is the initial parent.

7. The method of configuring the topology of a communication network of mesh network type according to claim 1 wherein the computing steps that are necessary for the node i to select the parent node are distributed among different nodes.

* * * * *